United States Patent
Lake et al.

(10) Patent No.: US 9,487,111 B2
(45) Date of Patent: Nov. 8, 2016

(54) SPINNING INFANT CAR SEAT

(71) Applicants: Jason Lake, Houston, TX (US);
Monique Norman, Houston, TX (US)

(72) Inventors: Jason Lake, Houston, TX (US);
Monique Norman, Houston, TX (US)

( * ) Notice: Subject to any disclaimer, the term of this patent is extended or adjusted under 35 U.S.C. 154(b) by 0 days.

(21) Appl. No.: 14/667,666

(22) Filed: Mar. 24, 2015

(65) Prior Publication Data
US 2015/0266399 A1    Sep. 24, 2015

Related U.S. Application Data

(60) Provisional application No. 61/969,657, filed on Mar. 24, 2014.

(51) Int. Cl.
*B60N 2/26* (2006.01)
*B60N 2/28* (2006.01)

(52) U.S. Cl.
CPC .......... *B60N 2/2869* (2013.01); *B60N 2/2821* (2013.01); *B60N 2/2845* (2013.01)

(58) Field of Classification Search
CPC . B60N 2/2869; B60N 2/2821; B60N 2/2845
USPC .................................................. 297/256.12
See application file for complete search history.

(56) References Cited

U.S. PATENT DOCUMENTS

| | | | | |
|---|---|---|---|---|
| 4,762,364 A * | 8/1988 | Young | ................. | B60N 2/2821 297/256.12 X |
| 4,936,629 A * | 6/1990 | Young | ................. | B60N 2/2821 297/256.12 |
| 4,971,392 A * | 11/1990 | Young | ................. | B60N 2/2821 297/256.12 |
| 5,183,312 A * | 2/1993 | Nania | ................. | B60N 2/146 297/256.12 X |
| 5,660,430 A * | 8/1997 | Clarke | ................. | A47D 9/02 297/256.12 X |
| 6,260,920 B1 * | 7/2001 | Tolfsen | ................. | B60N 2/14 297/256.12 X |
| 6,572,189 B1 * | 6/2003 | Blaymore | ................. | B60N 2/2806 297/256.12 X |
| 6,679,552 B1 * | 1/2004 | Kassai | ................. | B60N 2/2812 297/256.12 X |
| 7,073,859 B1 * | 7/2006 | Wilson | ................. | B60N 2/0232 297/256.12 X |
| 7,357,451 B2 * | 4/2008 | Bendure | ................. | B60N 2/2869 297/256.12 |
| 7,575,276 B1 * | 8/2009 | Henry | ................. | B60N 2/2821 297/256.12 |
| 7,712,830 B2 * | 5/2010 | Lhomme | ................. | B60N 2/2869 297/256.12 |
| 7,753,445 B2 * | 7/2010 | Kassai | ................. | B60N 2/2824 297/256.12 X |
| 8,419,129 B2 * | 4/2013 | Inoue | ................. | B60N 2/2806 297/256.12 X |
| 8,459,739 B2 * | 6/2013 | Tamanouchi | ........ | B60N 2/2806 297/256.12 |
| 8,651,572 B2 * | 2/2014 | Medeiros | ............... | A47D 1/002 297/256.12 X |
| 2001/0048237 A1 * | 12/2001 | Kassai | .................. | B60N 2/146 297/256.12 |
| 2006/0197364 A1 * | 9/2006 | Bendure | ............. | B60N 2/2869 297/256.12 |
| 2008/0054694 A1 * | 3/2008 | Lhomme | ............. | B60N 2/2821 297/256.12 |
| 2008/0054695 A1 * | 3/2008 | Lhomme | ............. | B60N 2/2806 297/256.12 |
| 2008/0252122 A1 * | 10/2008 | Vallentin | ............. | B60N 2/2821 297/256.12 |
| 2008/0315649 A1 * | 12/2008 | Lhomme | ............. | B60N 2/2821 297/256.12 |
| 2009/0033132 A1 * | 2/2009 | Lhomme | ............. | B60N 2/2869 297/256.12 |
| 2014/0084650 A1 * | 3/2014 | Rabeony | ................. | B60N 2/286 297/256.12 |

* cited by examiner

*Primary Examiner* — Rodney B White
(74) *Attorney, Agent, or Firm* — Ruth Eure

(57) ABSTRACT

An infant car seat with a base having a swivel platform which is easily rotatable in any direction, comprising a base having a swivel platform which is easily rotatable in any direction, and an infant car seat mounted onto the platform.

5 Claims, 3 Drawing Sheets

SPINNING INFANT CAR SEAT

CLAIM OF PRIORITY

This patent application claims priority under 35 USC 119 (e) (1) from U.S. Provisional Patent Application Ser. No. 61/969,657 filed Mar. 24, 2014, of common inventorship herewith entitled, "Spinning Infant Car Seat," which is incorporated herein by reference as though the same were set forth in its entirety.

FIELD OF THE INVENTION

The present invention pertains to the field of infant accessories, and more specifically to the field of infant car seats.

BACKGROUND OF THE INVENTION

The prior art has put forth several designs for infant car seats. Among these are:

U.S. Pat. No. 7,712,830 to Gilles Lhomme and Richard Baiud describes a child restraint includes a seat support and a juvenile seat mounted to swivel about an axis on the seat support. The seat support is adapted to set on a vehicle seat.

U.S. Pat. No. 7,357,451 to Connie S. Bendure, Augustine M. Mastroine and William A. Talerico describes a car seat for restraining a child during operation of a motor vehicle including a base capable of being removably disposed on a selected motor vehicle seat. A seat unit is swivelably connected to said base. A locking assembly selectively extends between the base and the seat unit for selectively restricting the swiveling of the seat unit on the base.

U.S. Pat. No. 6,572,189 to Lee M. Blaymore describes an infant car seat that is mounted on a stationary platform which comprises a lower horizontal plate and a vertical plate extending from one edge thereof. The stationary platform is secured by the seatbelts against the rear seat of the automobile adjacent the door. The child seat is pivotably attached to a vertical portion of the stationary platform by means of a hinge assembly that allows the user to stand outside the vehicle and swing the seat into a position to enable them to place the child directly therein in a face to face manner and then swing the seat back into place and lock it into a secure position. The child seat is secured to a seat support mechanism comprising a support bar pivotably connected to a hinge assembly that slides along a track assembly so as to maintain the car seat in a protected area within the vehicle when in the pivoted position.

None of these prior art references describe the present invention.

SUMMARY OF THE INVENTION

It is an object of the present invention to provide an infant car seat with a base having a swivel platform which is easily rotatable in any direction.

It is a further object of the present invention to provide an infant car seat with a base having a swivel platform which allows the seat to lock in any of four positions wherein the positions provide a front, back, left side and right side orientation of the seat to the base.

DETAILED DESCRIPTION OF THE INVENTION

Figure 1:
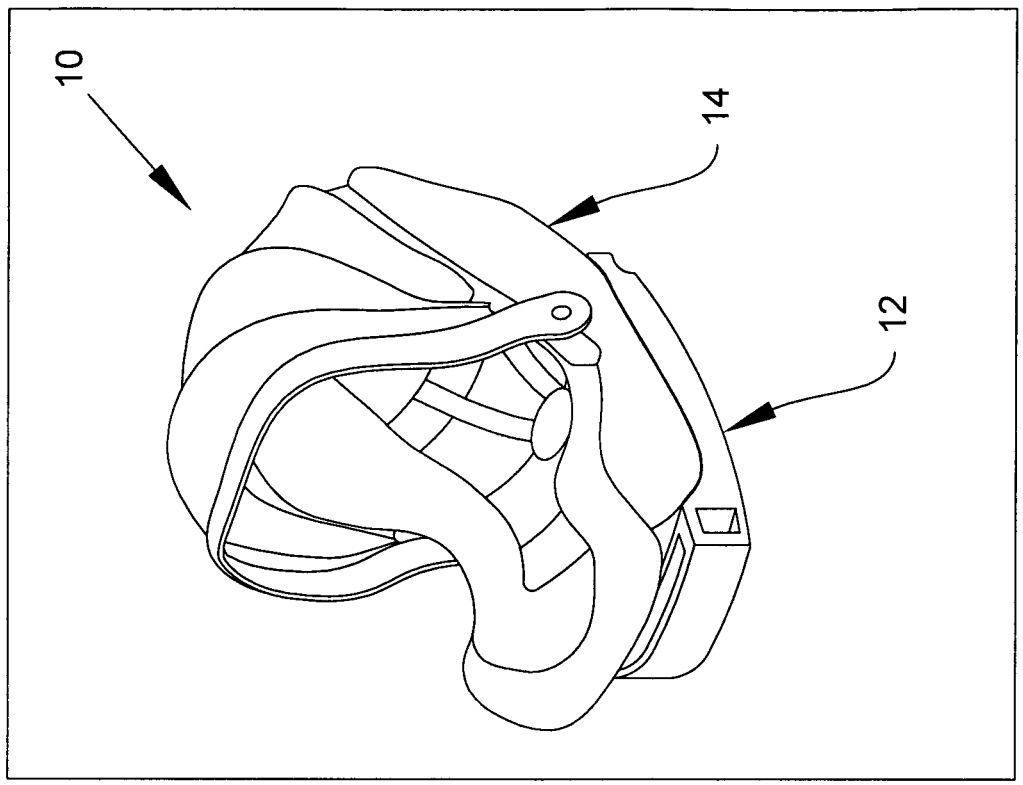
FIG. 1 is an illustrative prototypical diagonal back view showing a release locking lever and how the present invention rotates in approximately ninety degree increments.
Figure 2:
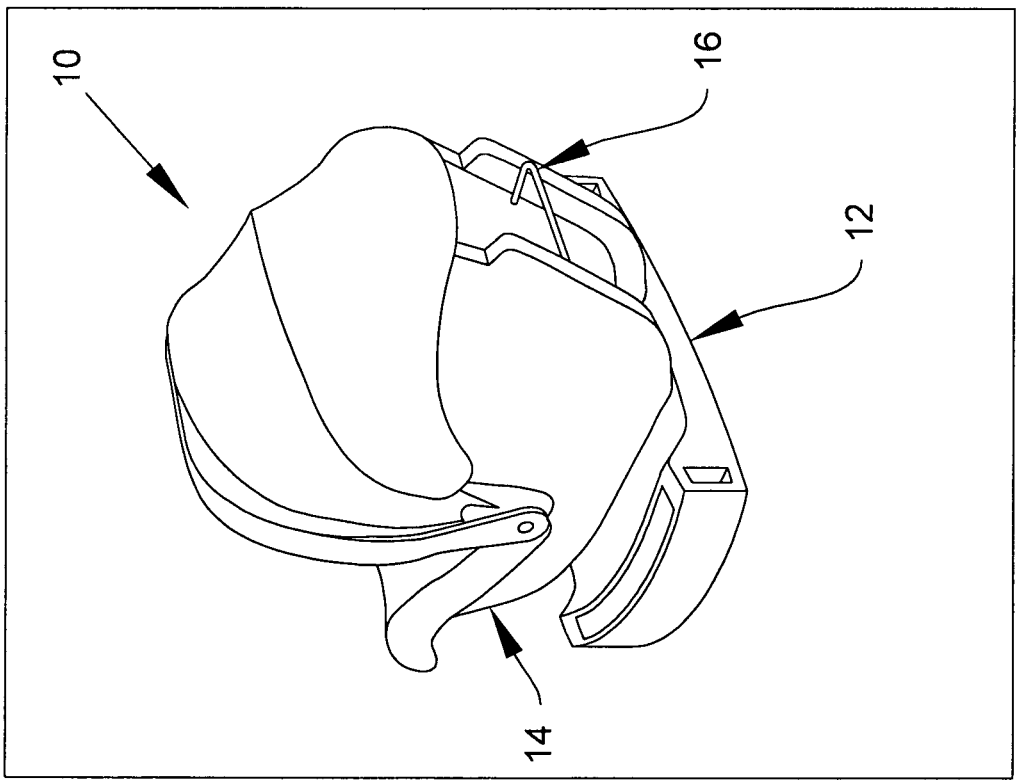
FIG. 2 is an illustrative prototypical diagonal front view showing the present invention in a locked and non rotating position.
Figure 3:
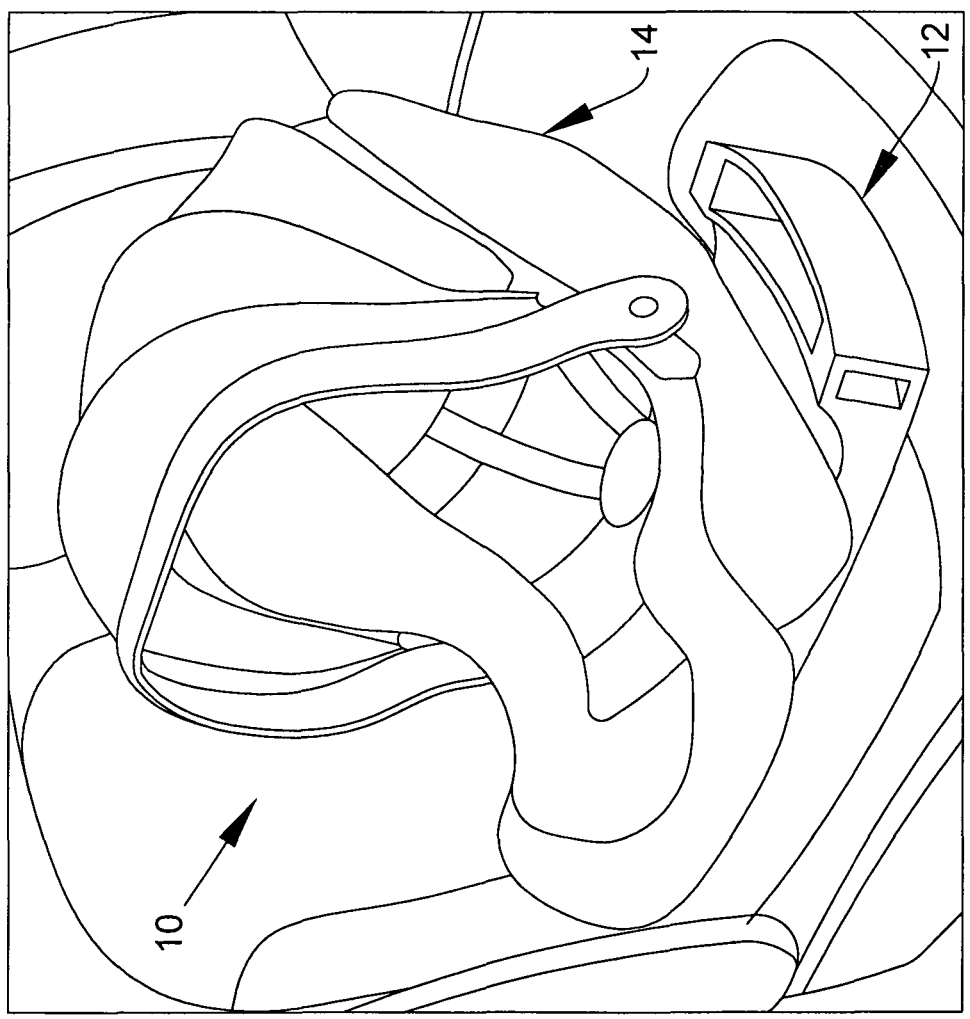
FIG. 3 is an illustrative prototypical diagonal front view showing the present invention installed in a vehicle and rotated towards an opened door for easier access in placing and removing an infant.

Perhaps one of the most practical and necessary of all infant accessories is a simple car seat. Used from the time of birth through toddler years and beyond, car seats are extremely useful devices which provide a comfortable and secure place for a child to sit when traveling in a car. A car seat is an invaluable safety tool that functions to fully restrain a child in the event of an automobile collision. The correct usage of infant car seats is proven to save lives. A car seat may mean the difference between life and death for children involved in a car accident. Car seats are used from the time of birth until the child is approximately four years old or forty pounds in weight, at which time the transitional child booster seat is employed. Carrier style car seats are most often utilized with newborn and young infants. Typically, these reclining and cradle like seats are utilized from time of birth until a child is approximately six to seven months old or twenty two pounds, at which point the child usually has developed enough strength to sit upright on their own and utilize an upright seat. Upright seats are typically utilized through the toddler years until the child has reached the weight of approximately forty pounds.

While there is little dispute that car seats are indeed a practical necessity, there are some drawbacks associated with their use. The actual act of placing a child into and removing them from their car seat is awkward and difficult. For safety purposes, it is recommended that infant seats be installed within a back seat of a vehicle in a rear facing position to protect the child, in the event of a collision, from slamming into deployed airbags or in worse case scenarios, a vehicle windshield. Placing a child within a car seat or removing them from the seat typically requires a parent or caregiver to climb into the vehicle back seat simply to easily reach their child. Leaning awkwardly into an open back door of a car, many parents and caregivers experience pain and discomfort when loading or unloading their child. For women who have only recently given birth, particularly those who are recovering from a Caesarian section, the strain and burden of reaching into the rear of a vehicle to reach a child restrained within a car seat is extremely taxing on the body, causing pain and discomfort. For those individuals who suffer chronic back pain, neck pain or obesity, leaning into a vehicle in attempts to reach one's child or climbing into the rear of a vehicle can become painful and difficult.

The present invention, hereinafter referred to as the Spinning Infant Car Seat 10, is an infant car seat 14 with a base 12 having a swivel platform which is easily rotatable in any direction. The base has a locking position at four points to allow easy access to the child facing front, back, left side or right side. The Spinning Infant Car Seat freely rotates the seat in approximately ninety degree increments, affording the user to easy and comfortable access to their child without having to climb into their car's back seat. The Spinning Infant Car Seat provides parents and caregivers with a simple means of assisting their child in and out of a car seat without having to climb completely into or lean awkwardly into the car.

The Spinning Infant Car Seat is similar in structure and function to a traditional car seat. The present invention is a cradle style carrier or an upright bucket style safety seat. Both embodiments are utilized by newborns and infants up to forty pounds in weight. The Spinning Infant Car Seat is comprised primarily of heavy duty plastic material with durable, stainless steel components. Standard to the present invention are a machine washable and cushiony soft padded liner, sunblocking canopy, a carrying handle, a three point harness, a three point harness with shield and a five point harness. The Baby Car Seat is secured in place within the back seat by way of a LATCH installation in newer cars or a vehicle's safety belt system in older cars. With the LATCH brackets or seat belt appropriately positioned and easily accessed on the base and sides of the seat.

The most notable aspect of the Spinning Infant Car Seat is its swivel mounted platform. Much like a turntable, this spinning base is configured to freely rotate the seat approximately ninety degrees in any direction. For safety purposes, a series of integrated locking points are incorporated into the design of the base platform with corresponding locking springs incorporated into the seat. This pin or pins are inserted into the base platform locking it into the stationary position and are lifted out of the platform to turn the seat by way of a simple hand operated release lever positioned on the side of the seat.

Figure 4:
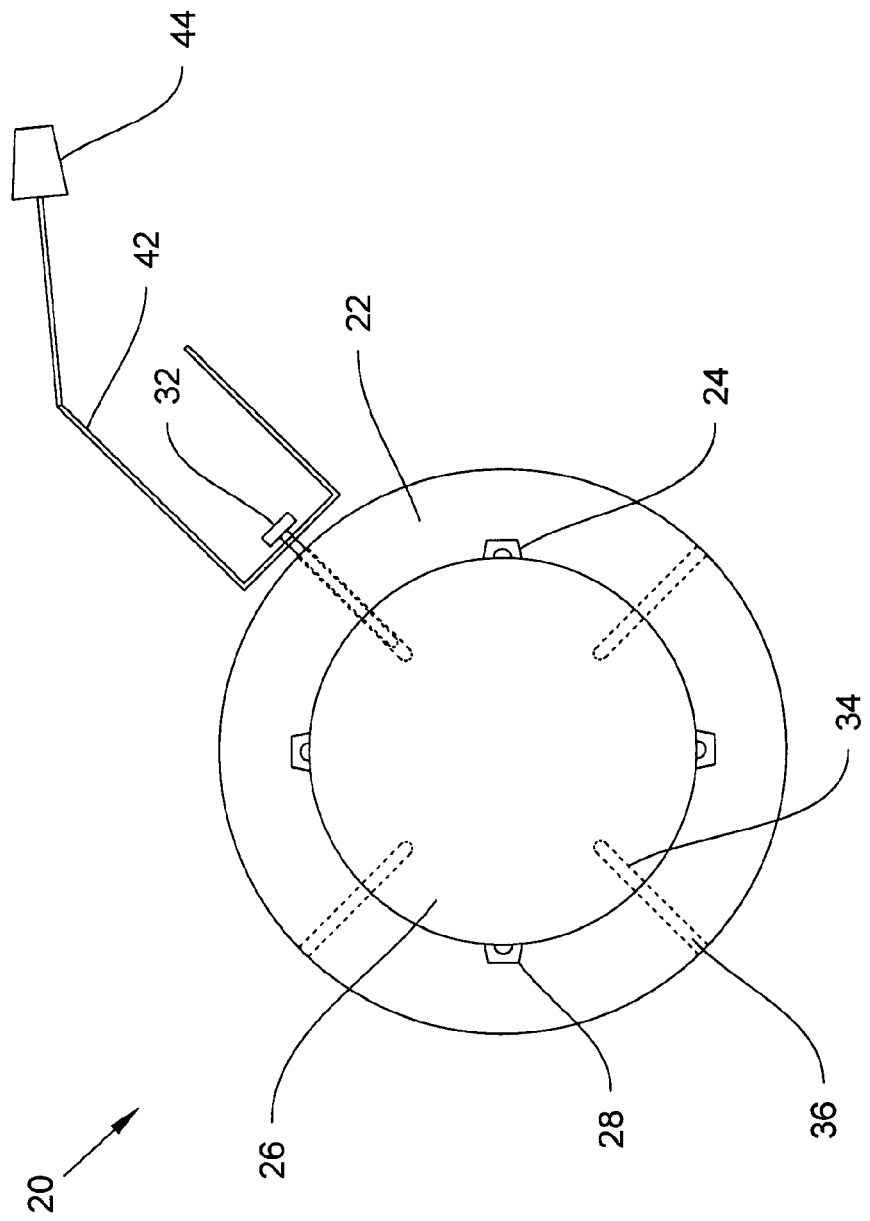
FIG. 4 is an illustrative top down view of one embodiment of the swivel mechanism of the present invention.

FIG. 4 shows an embodiment of the swivel platform of the car seat 20 comprising outer ring 22 having four equidistant notches 24 at its inner surface. Outer ring also has four equidistant holes 36 which are spaced midway between the notches 24. Inner ring 26 has protuberances 28 spaced equidistantly around the outer edge. Protuberances 28 of inner ring 26 fit into notches 24 of outer ring 22, and are secured by means of pin 32. Inner ring also has four grooves which are spaced equidistantly between the protuberances 28. Pin 32 fits into hole 36 in outer ring 22 and into groove 34 of inner ring 26 thereby securing the seat in place. One or more pins can be used to secure the seat. Up to four pins are contemplated.

Application and use of the Spinning Infant Car Seat is very simple and straight forward. Following package instructions, the user installs the Spinning Infant Car Seat within their vehicle's back seat utilizing the LATCH installation system or in the case of older vehicles, by way of the vehicle's safety belts. To place their child within the car seat, the user simply releases the locking pins that secure the turntable platform by employing an integrated release lever 42 positioned on the side of the seat. The release lever 42 is connected to lever handle 44. When lever handle 44 is pulled, release lever pulls up on pin or pins 32, thereby allowing the car seat to rotate. Thus released, the seat freely rotates while the base remains in a stationary position. Turning the seat so they can easily reach it from their position outside the vehicle, the user places their child within the car seat, securing the harness over their child and making any necessary adjustments for a comfortable and secure fit. Once the child is comfortably and safely restrained within the car seat, the user returns the seat to a rear facing or, for older infants and toddlers, a forward facing position, adjusting the angle of the seat and then releasing the lever to lock the seat to the base platform so the seat remains stationary during travel. If the parent needs to attend to their child, they reach over and access the release mechanism, shifting the car seat to face their direction and returning the seat to proper locked position after caring for the child.

The Spinning Infant Car Seat provides parents and caregivers a simple and efficient means of keeping their infant safely restrained when traveling in a car while also affording easy access to their child. The Spinning Infant Car Seat's inclusion of a swivel mounted platform enables a parent or caregiver to easily turn the seat in their direction in order to load or unload their child. The Spinning Infant Car Seat is manufactured in the highest of standards, ensuring safety and well being of infants and children. Easily installed and durably constructed, the present invention will provide parents as well as professional infant caregivers with a highly effectively functioning car seat for transporting infants and children.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. An infant car seat with a base having a swivel platform which is easily rotatable in any direction, comprising:
   a base having a swivel platform rotatable in any direction; and
   an infant car seat mounted onto the platform;
   wherein the base has a locking position at four points to allow easy access to the seat facing front, back, left side or right side;
   wherein the swivel platform of the car seat comprises outer ring having four equidistant notches spaced on an inner surface of the outer ring;
   wherein the outer ring also has four equidistant holes which are spaced midway between the notches and the holes are cylindrical and extend from an outer edge of the outer ring to an inner edge of the outer ring;
   wherein the swivel mechanism comprises an inner ring;
   wherein the inner ring has four protuberances spaced equidistantly around an outer edge of the inner ring;
   wherein protuberances of the inner ring fit into notches of the outer ring;
   wherein the inner ring also has four grooves which are spaced equidistantly between the protuberances of the inner ring, further comprising at least one pin; and
   wherein the pin or pins fits through the holes in the outer ring and into a groove or grooves on the inner ring, thereby securing the seat in place.

2. The infant car seat with a base having a swivel platform of claim 1, wherein the number of pins used is one, two, three, or four.

3. The infant car seat with a base having a swivel platform of claim 1, further comprising:
   a machine washable and cushiony soft padded liner positionable on the car seat, a sunblocking canopy positionable over the car seat, and a carrying handle mounted to the car seat, a three point harness mounted to the car seat, a three point harness with shield mounted to the car seat, and a five point harness mounted to the car seat.

4. The infant car seat with a base having a swivel platform of claim 1, wherein the seat is a cradle style carrier seat.

5. The infant car seat with a base having a swivel platform of claim 1, wherein the seat is an upright bucket style safety seat.

\* \* \* \* \*